US006916246B1

(12) United States Patent
Luciano, Jr.

(10) Patent No.: US 6,916,246 B1
(45) Date of Patent: Jul. 12, 2005

(54) VOUCHER-BASED PLAYER TERMINALS FOR USE IN A GAMING SYSTEM

(75) Inventor: Robert A. Luciano, Jr., Reno, NV (US)

(73) Assignee: Sierra Design Group, Las Vegas, NV (US)

( * ) Notice: Subject to any disclaimer, the term of this patent is extended or adjusted under 35 U.S.C. 154(b) by 0 days.

(21) Appl. No.: 10/661,335

(22) Filed: Sep. 12, 2003

Related U.S. Application Data

(62) Division of application No. 09/454,903, filed on Dec. 3, 1999, now Pat. No. 6,652,380.
(60) Provisional application No. 60/111,062, filed on Dec. 4, 1998.

(51) Int. Cl.[7] .................................................. A63F 13/00
(52) U.S. Cl. ............................................ 463/29; 463/42
(58) Field of Search ............................... 463/16–21, 25, 463/40–42; 273/143 R, 138.1

(56) References Cited

U.S. PATENT DOCUMENTS 6,048,269 A * 4/2000 Burns et al. .................. 463/25
6,500,067 B1 12/2002 Luciano et al.

* cited by examiner

*Primary Examiner*—Kim Nguyen
(74) *Attorney, Agent, or Firm*—Russ F. Marsden

(57) ABSTRACT

Voucher-enabled player terminals having games of chance thereon, for use in a gaming system having a network connection and a central server, are disclosed. The terminals can both read and print vouchers, and are active in processing the vouchers. One specific functional aspect of the terminals is that they are enabled to generate unique transaction identifiers that are used with a value (game credits or prize redemption values) to enable printing of voucher when cash-out occurs. Upon cash-out from a player terminal (or other terminal type), a player will be issued a new voucher having a transaction ID generated by the terminal, the transaction ID being unique to the particular system installation and associated with the value of the voucher, which the player may then take to a different terminal to continue game play.

8 Claims, 8 Drawing Sheets

Cashless Transaction System

Central Terminal

Automated Cash Exchange Terminal

Player Terminal

Automated Cash Exchange Terminal Shapes

Block Diagram
Cash Redemption
Terminal

External View
Cash Redemption
Terminal

Use Of Central
Cash Exchange Terminal

Use Of Automated
Cash Exchange Terminal

Use Of Automated
Cash Redemption Terminal

Use Of Central
Cash Redemption Terminal

VOUCHER-BASED PLAYER TERMINALS FOR USE IN A GAMING SYSTEM

RELATED APPLICATIONS

This application is a divisional application of utility application Ser. No. 09/454,903 filed on Dec. 3, 1999, now U.S. Pat. No. 6,652,380, which claims priority from provisional application 60/111,062 filed on Dec. 4, 1998. application Ser. No. 09/454,903 and 60/111,062 are hereby incorporated herein by reference.

BACKGROUND OF THE INVENTION

1. Field of the Invention

This invention pertains generally to gaming machines. More particularly, the present invention discloses a method and apparatus for enabling game play on games of chance using vouchers in conjunction with terminals that actively participate in the voucher-based transaction process.

2. Background of the Invention

Gaming systems using player terminals that take cash in exchange for game plays are known. In addition to cash as payment for game plays, some gaming systems have allowed players to establish a player's account, where the player provides their identity (name, address, social security number, and other data) to a casino who then sets up an account in their name. The player is allowed to transfer monetary value between their individual account (which keeps track of all interactions the player has with the gaming machines as part of the accounting records) and individual games.

Existing gaming systems are very limited in their use of non-cash payments for game play. There exists a need for a new gaming system that enables far more use of non-cash-based input for game play.

SUMMARY OF THE INVENTION

The applicant has invented a gaming system and method for a game player to play a game of chance without using cash at the gaming devices (player terminals), or in going from one player terminal to another. Instead, the present invention enables the-use of dynamically printed vouchers for use in the player terminals. These vouchers are also called cashless vouchers in the sense that the vouchers can be used instead of cash when playing betting games (games whose outcome is at least partially determined by chance). In one embodiment, a player provides input remuneration, such as cash, to a cash exchange terminal. The player receives a voucher from the cash exchange terminal, which has indicia on it corresponding to the value of the voucher. The player takes the voucher to a gaming device and then inserts the voucher into the gaming device in order to establish credit at the gaming device, thereby enabling game play. Upon termination of play at the gaming device, the player receives a new voucher if the player has a credit or award balance due to the player at the time of termination of play. The new voucher has indicia reflecting any such credit or award balance.

The player may then exchange the new voucher for remuneration or an award based on the credit or award balance corresponding to the voucher, or may continue game play at a different player terminal. If the player decides to cash-out the voucher, the cash-out process will typically take place at the cash exchange terminal.

If the player uses the new voucher to play at another player terminal, when play terminates at the second gaming device with a credit or award balance remaining for the player, the second gaming device issues a new voucher to the player reflecting such credit or award balance.

The gaming devices and cash exchange terminal(s) are interconnected on a communications network, such as a LAN. Preferably, the various indicia printed on the various vouchers are encrypted according to a security algorithm.

Other aspects of the present invention will become apparent as this specification proceeds.

DETAILED DESCRIPTION OF THE INVENTION

Figure 1:
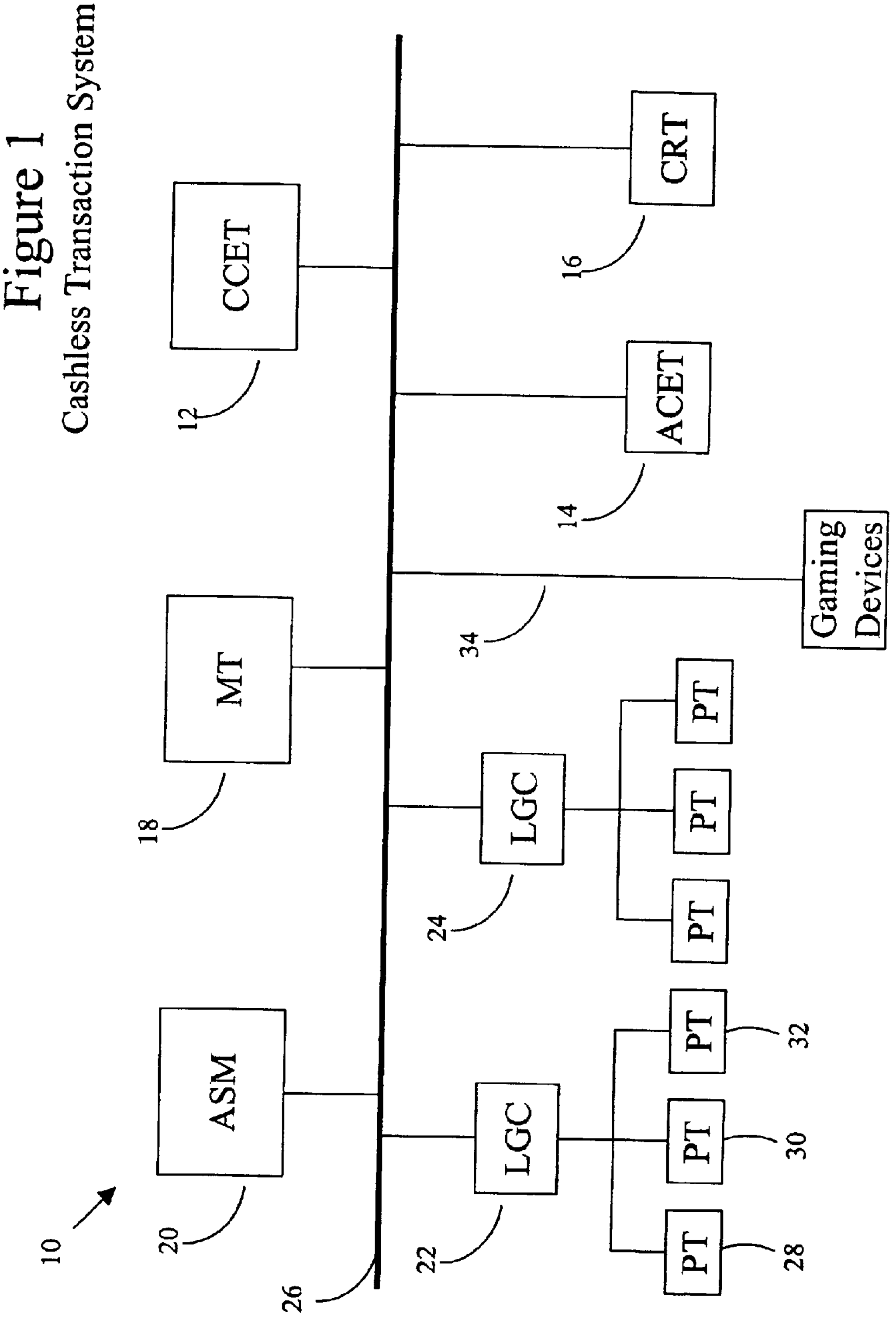
FIG. 1 is a block diagram of the applicant's voucher gaming system network in accordance with the present invention.

With reference now to FIG. 1, the applicant's preferred cashless gaming system, generally 10, has a central cash exchange terminal (CCET) 12, an automated cash exchange terminal (ACET) 14, an automated cash redemption terminal (CRT) 16, a monitor terminal (MT) 18, an account server manager PC-based workstation (ASM) 20, and two lottery or local game controllers (LGC) 22 and 24 all interconnected and mounted on a central local Area Network (LAN) 26. The LAN 26 is preferably an Ethernet LAN 26, and player terminals (PTs), e.g., 28, 30, 32, are connected to their respective LGC's, e.g., 22, on the LAN 26, the connection being in a fashion well known in the art. The LAN 26 may also be connected 34 to a variety of other LGC's (not shown) in a fashion well known in the art. The monitor terminal 18 and ASM 20 consist of personal computers that respectively run monitoring and database software, and are operably connected on the LAN 26 in a fashion well known to those skilled in the art.

Figure 2:
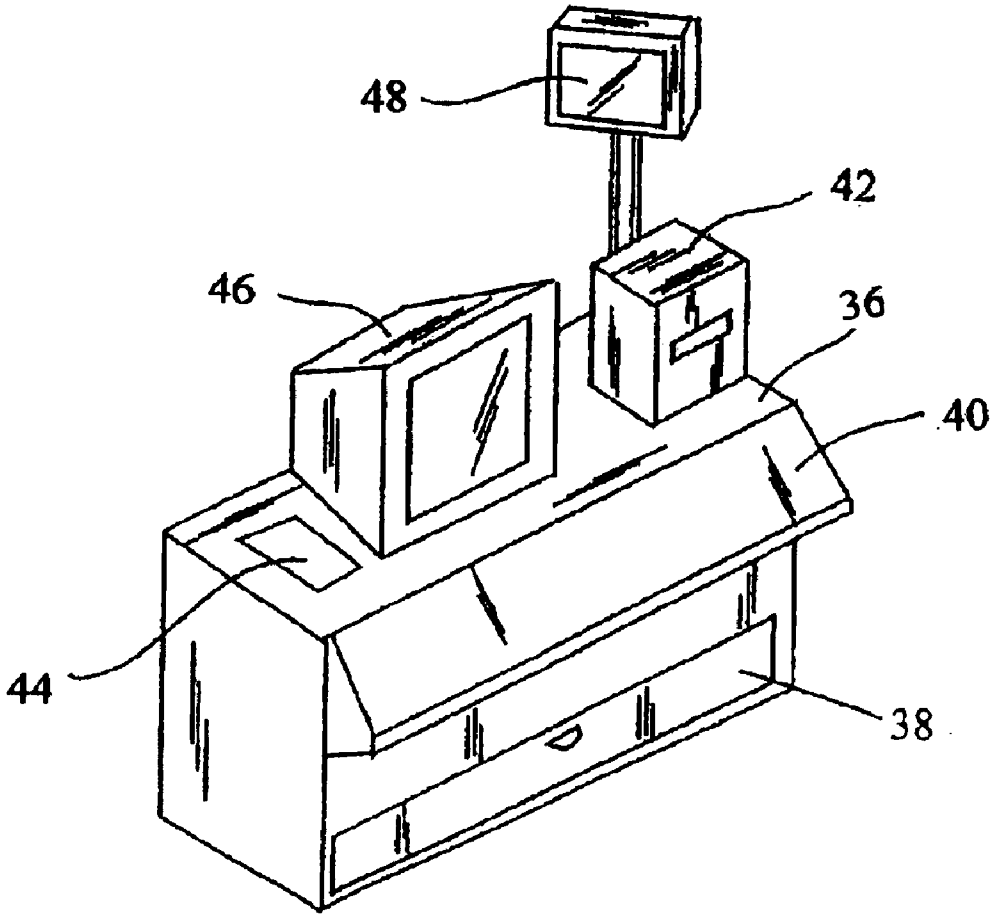
FIG. 2 is a pictorial view of a central cash exchange terminal in accordance with the present invention.
Figure 3:
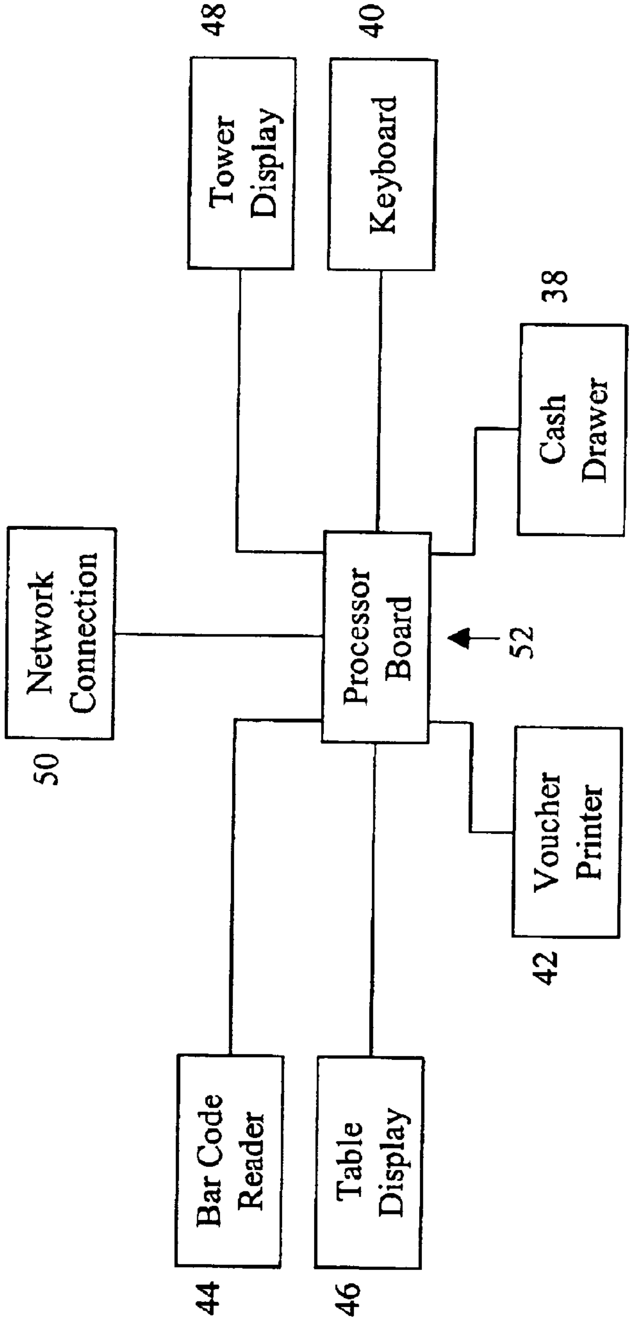
FIG. 3 is block diagram of the central cash exchange terminal in accordance with the present invention.

With reference now to FIG. 2, the CCET 12 has a terminal frame 36 with a personal computer motherboard (not shown in FIG. 2) mounted within the frame 36. Also mounted on the periphery of the frame 36 are a cash and voucher drawer 38, an input keyboard 40, a voucher printer 42, a voucher bar code reader 44, network communications ports 50 (not shown in FIG. 2), a cashier video display 46, and a player or customer video display 48. With reference now to FIG. 3, the personal computer motherboard 52 mounted within the CCET 12 of FIG. 2 has input/output ports driving and supporting the bar code reader 44, the cashier or table display 46, the voucher printer 42, the cash drawer 38, the keyboard 40, the customer or tower display 48, and the conventional communications port 50 connected to the LAN 26 of FIG. 1. The CCET 12 may also have a receipt printer arranged to operate in association with CCET 12, the receipt printer operably connected to the CCET in a fashion well known to those skilled in the art.

Referring back to FIG. 2, a cashier (not shown) who operates the CCET 12 can receive cash (not shown) from a game player (not shown), enter information about the transaction into the CCET 12 through keyboard 40, procure a printed voucher (not shown) from the voucher printer 42, and hand the printed voucher to the game player. In one preferred embodiment the printed voucher has a bar code that includes information about the transaction encoded and embedded within the bar code including a unique transaction identifier or unique transaction identification (identifier and identification reference the same transaction ID). A transaction identifier can be based on a unique random number generated by a random number generator running in the ASM 20 of FIG. 1. A transaction identifier may also be based on one or more of a time, date, and/or a machine identifier to form a unique transaction identifier, or may be based on or use other information or source of numbers to form unique transaction identifiers, and be generated by any terminal. The transaction identifier is then encrypted (in one embodiment) by the ASM 20 or by the CCET 12 (in another embodiment) and included by the CCET 12 in the bar code printed on the voucher by the voucher printer 42. Although encryption is preferred for security reasons, the system of the present invention is fully operable without it.

The cashier may also receive a voucher from the player, scan and thereby retrieve information from the voucher with the bar code reader 44, deposit the voucher in the drawer 38, and procure from the drawer 38 the cash balance stated for the voucher on the video displays 46 and 48. The cashier may then dispense the cash thus procured from the drawer 38 to the player, and the player may confirm the amount due to the player by viewing transaction data shown on the customer video display 48.

Figure 4:
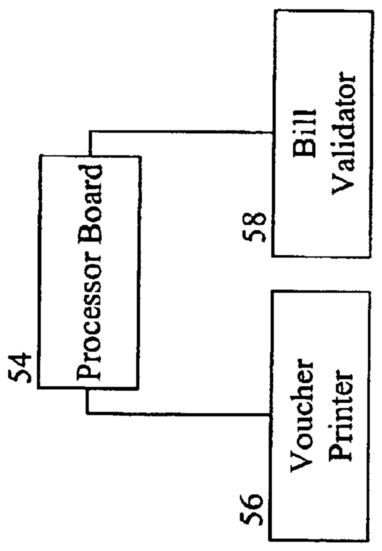
FIG. 4 is a block diagram of an automated cash exchange terminal in accordance with the present invention.
Figure 6:
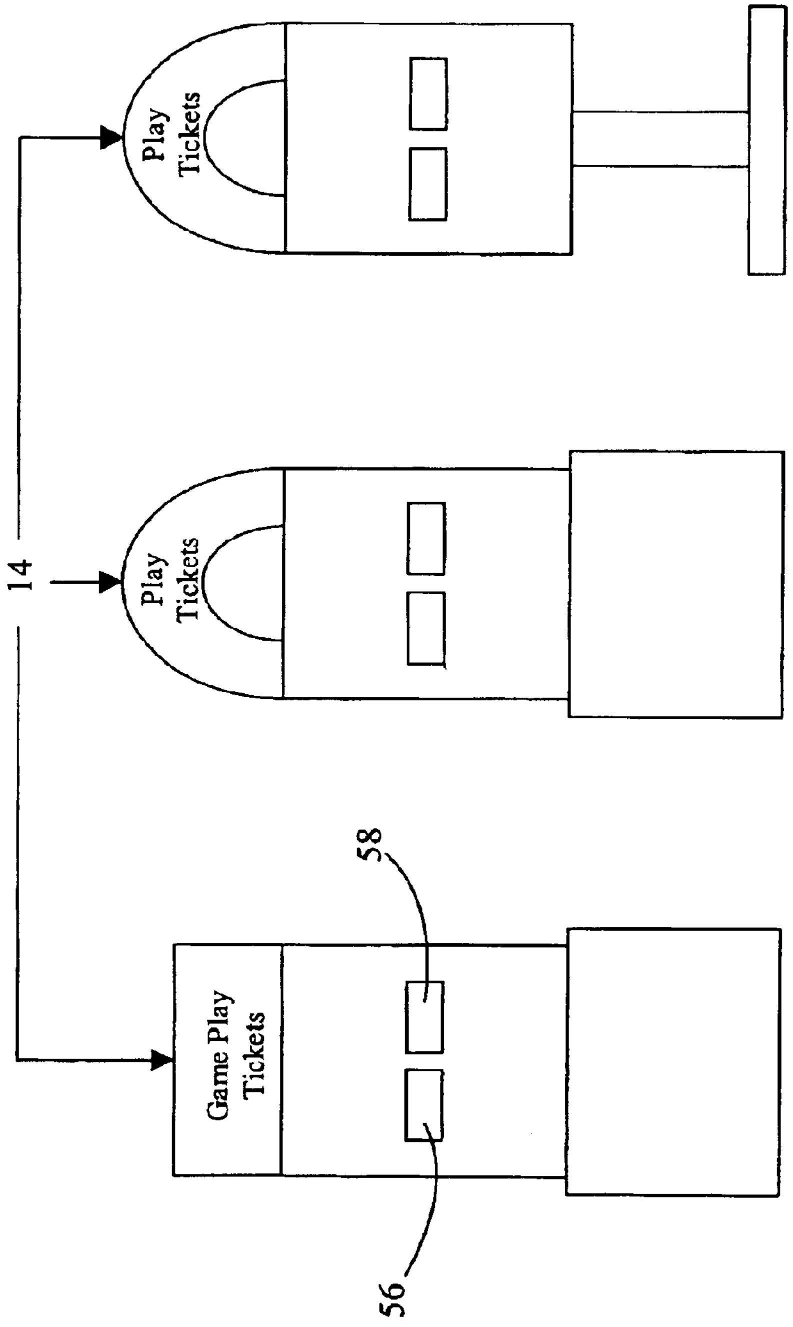
FIG. 6 is an illustration of differing external shapes of peripheral cash exchange terminals in accordance with the present invention.

With reference now to FIG. 4, the ACET 14 has a PC processor board 54 with input/output ports driving and supporting voucher printer 56, bill validator 58, and conventional communications port 60 connected to the LAN 26 of FIG. 1. As shown in FIG. 6, the preferred system and method may employ a bank of ACETs 14, with the ACETs having a variety of external shapes. The game player may thus insert cash, expeditiously and with no human interaction, into the bill Validator 58, and if the bill is validated the voucher printer 56 prints and dispenses to the player a voucher having a bar code or other machine readable indicia printed thereon, the bar code (or other machine readable indicia having the same contents) containing a transaction identifier usable for finding an associated value, and optionally having indicia representing the value embedded within it.

Figure 5:
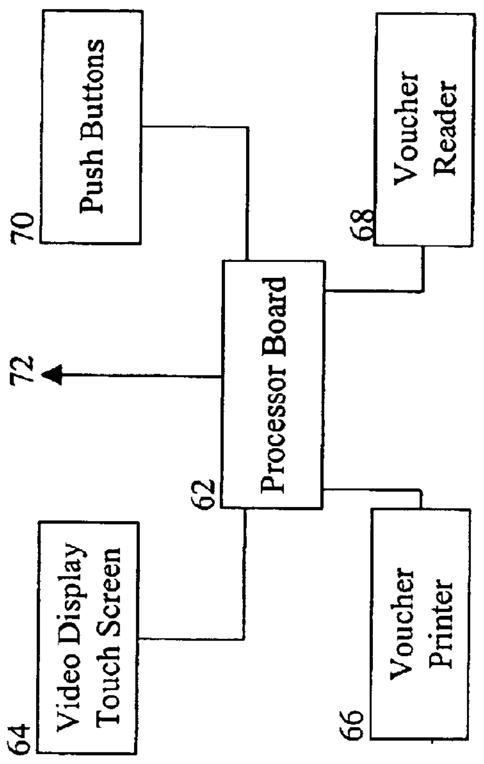
FIG. 5 is a block diagram of a player gaming device or player terminal in accordance with the present invention.

With reference now to FIG. 5, each PT, e.g., 28, has a personal computer processor board 62 and input/output ports driving and supporting a game video display and touch screen 64, a voucher printer 66, a voucher reader 68, game controlling push buttons 70, and conventional network communication ports 72. The game player may thus insert a voucher into the voucher reader 68, which, as needed or desired, decrypts the voucher. If the credit amount on the voucher is sufficient, the player may initiate game play through the display and touch screen 64 and push buttons 70. Crediting the game for game play may take place in cooperation with verification and/or confirmation of the voucher data, or be coupled with the retrieval of a value associated with the voucher using the ASM 20 of FIG. 1.

Referring back to FIG. 5, when the player terminates play by pushing appropriate conventional buttons 70 on the PT 28, the processor board 62 and its software thereon is programmed to drive the voucher printer 66 to issue a voucher to the player. The new voucher has a bar code printed thereon by the printer 66, the bar code including information about, or an indicator usable to point to, the credit or award balance due to the player on termination of play on the PT. The PT 28 also sends the transaction identifier and value information to the ASM 20 of FIG. 1, where the ASM 20 records and stores the information in a database maintained on the ASM 20.

Alternatively, the PT 28 may include conventional cash bins and hoppers, and the processor board 62 may be programmed to provide the player with an option, via the touch screen 64, to elect to receive an award in cash in the hopper at the PT 28. In this event, the PT 28 may issue a cash award rather than the voucher noted above to the player, and this cash award event may be structured as is well known in the art to generate noise and excitement in the gaming establishment.

Figure 7:
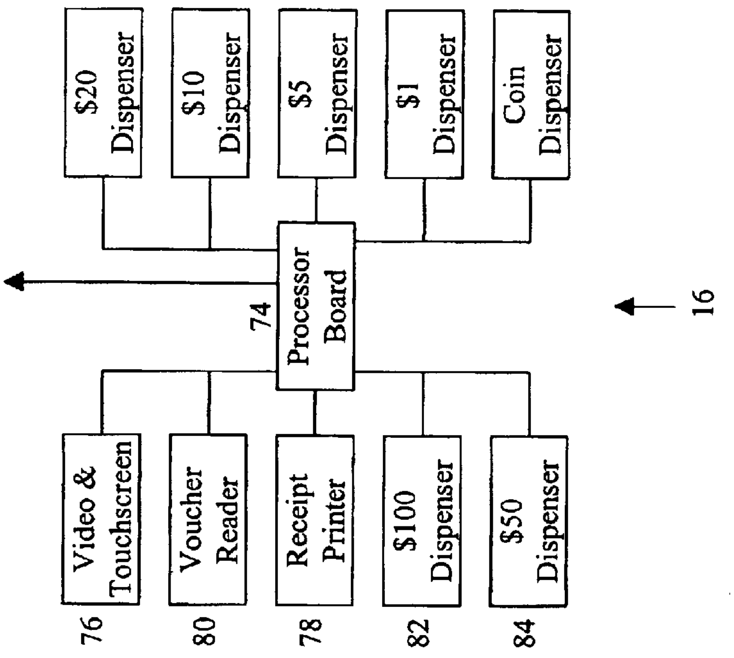
FIG. 7 is a block diagram of a cash redemption terminal in accordance with the present invention.
Figure 8:
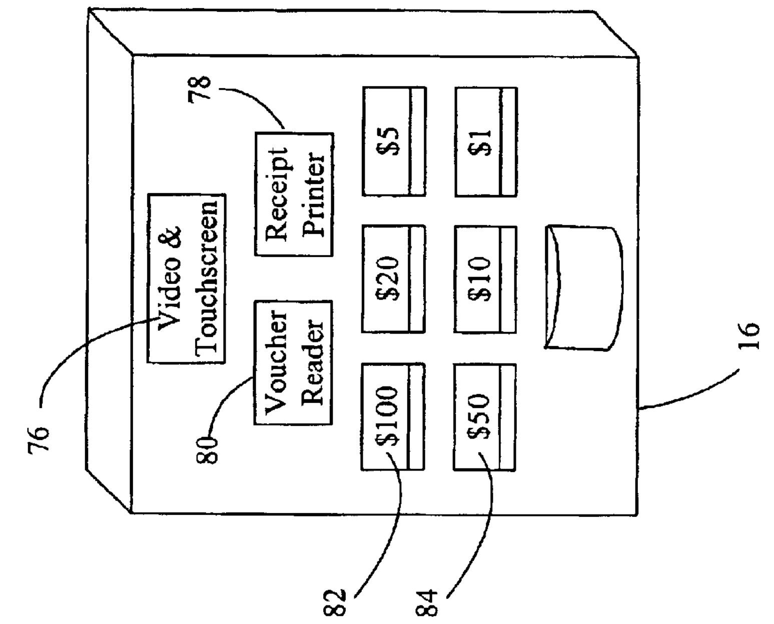
FIG. 8 is an external view of a cash redemption terminal in accordance with the present invention.

With reference now to FIG. 7, the CRT 16 has a personal computer processor board 74 with input/output ports supporting and driving a video display touch screen 76, a receipt printer 78, a voucher reader 80, and a variety of cash dispensers of differing yet common cash denominations such as 82 and 84. CRT 16 is further shown in FIG. 8, with the described components embodied in an enclosure. The above-referenced components are programmed and driven so that, upon the insertion of a voucher into the voucher reader 80, the voucher reader 80 decrypts information on the voucher, and then verifies through communication with the ASM 20 the voucher information, confirming or establishing the value associated with the voucher. The display touch screen 76 then displays the amount shown on the voucher and presents the voucher-bearer with the choice of types of cash denominations in which to receive the value in cash from the CRT 16. When the voucher-bearer touches the selected denomination and the value of the inserted voucher includes enough of a balance to issue such a denomination, the selected denomination issues from the appropriate cash dispenser, e.g. 82, 84, on the CRT 16. The CRT 16 automatically issues any lesser balance owed to the player in automatically determined cash dispensers from the appropriate lesser denominations. The receipt printer 80 on the CRT 16 also issues a receipt to the voucher-bearer, and the CRT 16 retains the voucher.

Figure 9:
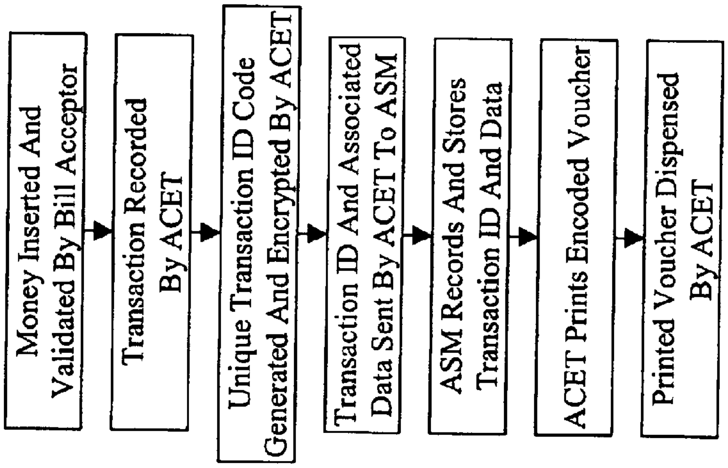
FIG. 9 is a flow chart of a method of use of an automated cash exchange terminal to procure a voucher in accordance with the present invention.

With reference now to FIGS. 1 and 9, one alternative for procuring a voucher in order to commence voucher-based gaming is for the player to insert money in to a bill acceptor in the ACET 14. The ACET 14 generates and encrypts (encryption used in one embodiment) a unique transaction identifier, the encryption being done according to any of a number of encryption techniques well known to those skilled in the art. The ACET 14 then sends the transaction identifier and associated data, such as the amount of money inserted into the bill acceptor, to the ASM 20. The ASM 20 records and stores the transaction identifier and associated data. The ACET 14 then prints a voucher with a bar code containing the transaction identifier and associated data. The ACET 14 then dispenses the voucher to the player.

Figure 10:
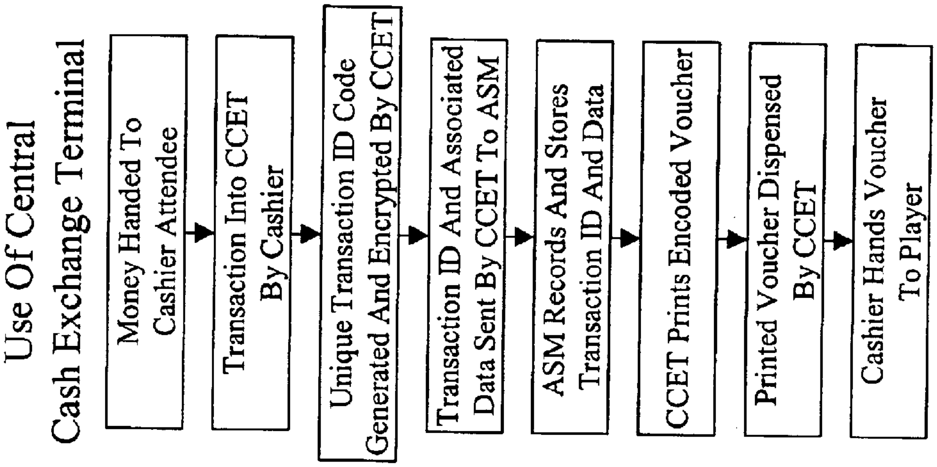
FIG. 10 is a flow chart of a method of use of the central cash exchange terminal in accordance with the present invention.

With reference now to FIGS. 1 and 10, another method of procuring a voucher is through the CCET 12 of FIG. 1. The player hands money to the cashier, and the cashier then enters the value of the transaction into the CCET 12. As shown in FIG. 2, the value entered is shown on the video displays 46 and 48 so that the cashier and player may see the value of the transaction as it is entered by the cashier into the system. With reference back to FIGS. 1 and 10, the CCET 12 generates and encrypts (in one embodiment) a unique transaction identifier, the encryption being done according to any of a number of encryption techniques well known to those skilled in the art. The CCET 12 then sends the transaction identifier and associated data, such as the amount of money inserted into the bill acceptor, to the ASM 20. The ASM 20 records and stores the transaction identifier and associated data. The CCET 12 then prints a voucher with a bar code containing the transaction identifier and/or associated data. The CCET 12 then dispenses the voucher to the cashier, and the cashier then hands the voucher to the player. The issuance of the voucher is confirmed on the video displays 46 and 48 as shown in FIG. 2.

Figure 11:
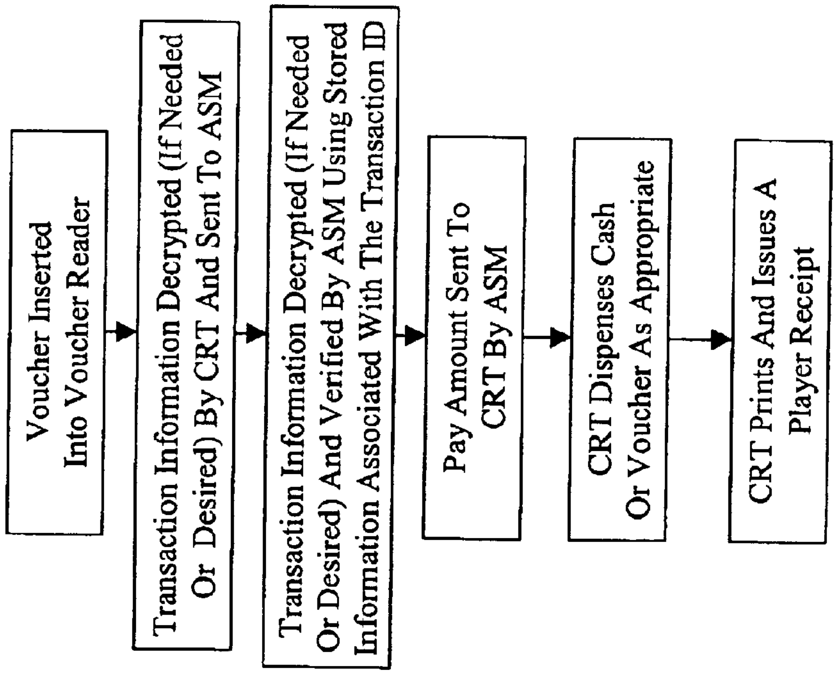
FIG. 11 is a flow chart of the applicant's method of use of an automated cash redemption terminal in accordance with the present invention.

With reference now to FIGS. 1 and 11, a player may cash in a voucher by inserting the voucher into a voucher reader (68 in FIG. 5) at the CRT 16. The CRT 16 decrypts, if needed or desired, the information on the voucher, then sends the information to the ASM 20. The ASM 20 then decrypts, if needed, the information from the voucher and then as needed may find and/or verify and/or confirm a value associated with this voucher. If the ASM 20 determines that the voucher is invalid (i.e., cannot confirm validity), the ASM 20 sends an instruction to the CRT 16 to reject the voucher.

If the ASM 20 confirms that the voucher is valid, it sends the verified value to the CRT. The CRT 16 then, through its touch screen and display (64 in FIG. 5), asks the player to make a selection of cash or a voucher for later use by the player at, for example, a later date or visit by the player to the gaming establishment. After the player makes his or her selection through the touch screen, the CRT 16 issues cash or a voucher, and a receipt, according to the selection made by the player.

Figure 12:
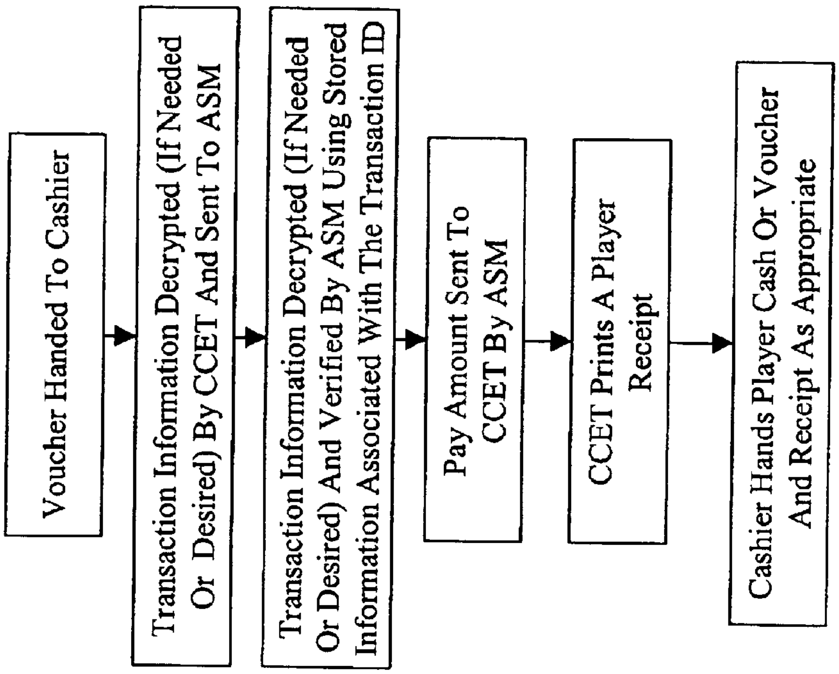
FIG. 12 is a flow chart of a method of use of an central cash exchange terminal in accordance with the present invention.

With reference now to FIGS. 1 and 12, a player may alternatively cash in a voucher by handing the voucher to a cashier at the CCET 12. The CCET 12 decrypts, if needed or desired, the information on the voucher, then sends the information to the ASM 20. The ASM 20 then decrypts, if needed, the information from the voucher and then as needed may find and/or verify and/or confirm a value associated with this voucher. If the ASM 20 determines that the voucher is invalid (i.e., cannot confirm validity), the ASM 20 sends an instruction to the cashier at the CCET 12 to reject the voucher.

If the ASM 20 confirms that the voucher is valid, it sends the verified value to the CCET 12 and displays the value on the two CCET display screens (46, 48). The cashier then asks the player to make a selection of cash or a voucher or a combination of both, the voucher usable for later use by the player at the gaming establishment. After the player states his or her selection to the cashier, the cashier issues cash or procures the issuance of a voucher, and a receipt, according to instructions entered by the cashier through the CCET keyboard 40 as shown in FIG. 2. The cashier also inserts the voucher received from the player into the cash and voucher drawer 38.

It can thus be seen that the preferred embodiments described above provide a method and system for cashless playing of games of chance. The player need not carry cash from place to place in the gaming establishment and need not even deal with a cashier. The player also may leave the gaming establishment and return to play another day without having to carry cash to and from the establishment at least to the extent of a voucher issued to the player at the termination of game play. Further, the player never has to set up an individualized account or a player account. Other advantages flow from the invention and various alternatives and embodiments noted above.

It is to be understood that the foregoing is a detailed description of preferred embodiments. The scope of the invention is not limited to these specific embodiments, however, as various elements and details can differ and still be within the inventive concepts of the present disclosure. The scope of the invention is determined by the following claims and their legal equivalents.

What is claimed is:

1. A player terminal configured for use in a gaming environment, where the gaming environment is one where cash cannot be used at the player terminals, and where cashless vouchers are used at the player terminals and where the cashless voucher further comprise indicia thereon, and where the indicia further comprises a transaction identifier, the player terminal comprising:

- a game operably disposed within said player terminal, said game usable for gambling and playable by a player;
- a network interface for operably connecting said player terminal to a communications network;
- a cashless voucher reader operably disposed within said player terminal and configured to read cashless voucher indicia;
- a cashless voucher printer operably disposed within said player terminal and configured to print cashless voucher indicia on a cashless voucher; and,
- where said player terminal is further configured to
  - receive cashless voucher indicia from said cashless voucher reader,
  - send said cashless voucher indicia operably out of said network interface,
  - receive value data from said network interface where said value data comprises a value associated with a transaction identifier extracted from said cashless voucher indicia,
  - generate a transaction identifier,
  - associate a value with said generated transaction identifier and then send said associated information operably out of said network interface, and,
  - use said generated transaction identifier to print a cashless voucher having indicia thereon correlating to said generated transaction identifier.

2. The player terminal of claim 1 where said indicia on said cashless vouchers further comprises at least partially encrypted data.

3. The player terminal of claim 1 where said transaction identification comprises a value derived from time.

4. The player terminal of claim 1 where said transaction identification comprises a value that makes use of at least one of: date, machine number, or random number.

5. A method for using cashless vouchers with a player terminal having a game usable for gambling operably disposed therein, in a gaming environment where cash cannot be used at the player terminals, and cashless vouchers are used at the player terminals and where the cashless vouchers comprise indicia thereon, and where the indicia further comprises a transaction identification, the method comprising:

receiving a cashless voucher into a cashless voucher reader operably disposed within the player terminal;

reading said indicia on said cashless voucher;

sending said indicia via a network to a computer having operably disposed thereon a database configured to associate said transaction identification portion of said indicia with a value;

receiving from said computer having said database said value associated with said transaction identification portion of said indicia;

making playable a number of game credits corresponds to said received value, and generating a transaction identifier by said player terminal and associating said generated transaction identifier with a value transmittable to said computer, said generated transaction identifier for use on a cashless voucher when a cash-out occurs which requires a voucher to be printed at said player terminal.

6. The method of claim 5 where said transaction identifier is at least partially encrypted.

7. The method of claim 5 where said transaction identifier comprises a value derived from time.

8. The method of claim 7 where said transaction identifier comprises a value making use at least one of: date, machine number, or random number.

* * * * *